United States Patent
Smith (10) Patent No.: US 6,802,020 B1
(45) Date of Patent: Oct. 5, 2004

(54) APPARATUS AND METHOD FOR DYNAMICALLY REROUTING A NETWORK REQUEST BASED ON SHARED PREDICTIVE FAILURE INFORMATION

(75) Inventor: Gordon James Smith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/580,048

(22) Filed: May 26, 2000

Related U.S. Application Data (63) Continuation-in-part of application No. 09/522,127, filed on Mar. 9, 2000.

(51) Int. Cl.$^7$ .............................................. G06F 11/00
(52) U.S. Cl. ............................................ 714/4; 714/47
(58) Field of Search ....................... 714/4, 6, 47; 713/2, 713/300; 711/162; 370/216

(56) References Cited

U.S. PATENT DOCUMENTS

| | | | | |
|---|---|---|---|---|
| 4,769,761 A | * | 9/1988 | Downes et al. ............. 709/224 |
| 4,868,818 A | * | 9/1989 | Madan et al. ................... 714/4 |
| 5,229,990 A | * | 7/1993 | Teraslinna .................. 370/218 |
| 5,283,905 A | * | 2/1994 | Saadeh et al. .............. 713/324 |
| 5,637,241 A | * | 6/1997 | Moates ........................ 219/109 |
| 5,805,166 A | * | 9/1998 | Hall et al. ................... 345/839 |
| 5,848,073 A | * | 12/1998 | Abdelmonem et al. ...... 714/704 |
| 5,892,916 A | * | 4/1999 | Gehlhaar et al. ........... 709/223 |
| 6,085,178 A | * | 7/2000 | Bigus et al. ................... 705/80 |
| 6,249,883 B1 | * | 6/2001 | Cassidy et al. ............... 714/42 |
| 6,298,308 B1 | * | 10/2001 | Reid et al. ..................... 702/56 |
| 6,411,506 B1 | | 6/2002 | Hipp et al. |
| 6,427,114 B1 | | 7/2002 | Olsson |
| 6,446,123 B1 | * | 9/2002 | Ballantine et al. ........... 709/224 |
| 6,535,991 B1 | * | 3/2003 | Gallant et al. ................. 714/4 |
| 6,609,212 B1 | * | 8/2003 | Smith ............................ 714/4 |

* cited by examiner

*Primary Examiner*—Robert Beausoliel
*Assistant Examiner*—Michael Maskulinski
(74) *Attorney, Agent, or Firm*—Martin & Associates, LLC; Derek P. Martin (57) ABSTRACT

An apparatus and method shares predictive failure information between computer system in a computer network. The shared predictive failure information allows dynamically rerouting a network request to avoid a computer system that may fail according to its predictive failure information. According to a first embodiment, if the requested resource on the network has predictive failure information that indicates the resource may soon fail, a message is returned to the requesting computer with information that includes possible alternative sites from which the information may be obtained. If there is an alternative site, the requesting computer system may access the alternative site, thereby avoiding the computer system that may soon fail. If there is no alternative site, the requesting computer system may return an error message, or may simply access the original resource on the chance that is has not yet failed. According to a second embodiment, a router in the network may indicate one or more alternative paths to a resource if the predictive failure information for the router indicates it may soon fail. The requesting computer system may then access the requested resource via the alternative path. In this manner, predictive failure information can be used in rerouting network traffic between computer systems on a network to minimize the effect of a failing, computer system.

31 Claims, 11 Drawing Sheets

| Returned from Prior Art ruptime command | |
|---|---|
| hostname | 910 |
| status | 912 |
| load average | 914 |
| time | 916 |
| number of users | 918 |

FIG. 9  Prior Art

| Returned from new ruptime command | |
|---|---|
| hostname | 910 |
| status | 912 |
| load average | 914 |
| time | 916 |
| number of users | 918 |
| predictive failure warning | 1010 |
| alternative site or path | 1020 |

APPARATUS AND METHOD FOR DYNAMICALLY REROUTING A NETWORK REQUEST BASED ON SHARED PREDICTIVE FAILURE INFORMATION

PARENT APPLICATION

This patent application is a continuation-in-part of my earlier patent application entitled "APPARATUS AND METHOD FOR SHARING PREDICTIVE FAILURE INFORMATION ON A COMPUTER NETWORK", Ser. No. 09/522,127, filed on Mar. 9, 2000, which is incorporated herein by reference.

BACKGROUND OF THE INVENTION

1. Technical Field

This invention generally relates to data processing, and more specifically relates to apparatus and methods for predicting failures in networked computer systems and acting on the predicted failures.

2. Background Art

Electronics and computers have greatly enhanced worker productivity in our modem information age. Much attention and many resources have been directed to making electronic and computer systems more reliable. When an electronic component or system fails, it can lead to system-wide failures that can cost companies millions of dollars. In such a context, it became necessary to prevent system failures.

Early attempts at preventative maintenance simply replaced certain components after a specified period of time in use. While this approach is effective if the time periods are selected with care, it is also very expensive, and leads to replacing components that do not need to be replaced. Some individual components can perform without problems for much longer than the mean time of operation without failures. By replacing components that do not need to be replaced, the cost of maintenance becomes excessive.

Another approach to preventative maintenance is to monitor components and replace a component when its operating parameters indicate that it may fail soon. This approach was pioneered by IBM in the early 1990s, and led to a concept referred to as Predictive Failure Analysis (PFA). Predictive failure analysis was first applied to hard disk drives. PFA status is in a normal state when the disk drive is operating correctly, and is in a "tripped" state when the PFA in the drive indicates that a failure will occur soon. A hard drive that has PFA capability monitors its internal functions, and indicates when the functions are outside of predefined limits by "tripping" a signal that indicates that the disk drive is about to fail. For example, a PFA status may be tripped if the fly height of a head is outside of specified limits, or if the error rate in the hard disk drive exceeds a specified limit. By indicating via the PFA status on a disk drive that a failure will likely happen soon, the system administrator has enough time to copy the contents of the disk drive to a backup source, replace the drive, and write the data from the backup to the new drive. PFA is thus an important tool that allows replacing a disk drive that may fail soon without loss of data.

Recognizing the value of predicting failures in disk drives, some competitors of IBM have implemented disk drives that have a S.M.A.R.T. interface, which stands for Self Monitoring And Reporting Technology. The S.M.A.R.T. interface is a specification of a set of registers in a device that contains information relating to the device's operation. No details are provided regarding the specific types of measurements that should be made or the values that indicate an impending failure. For this reason S.M.A.R.T. compatible disk drives are much less sophisticated that IBM disk drives that include Predictive Failure Analysis.

Predictive Failure Analysis has been implemented into components such as disk drives and printers. Communication of information relating to predicted failures has been limited so far to the boxlevel of a computer system, which means that a component inside a computer reports predictive failure information within its own box, but this information has typically not been used or communicated outside of a particular computer system. With the popularity of computer networks, it would be useful to share predictive failure analysis information between computer systems on a network. Furthermore, by detecting when certain computer systems may fail, it may be possible to reroute a, network request to avoid a computer system or network path that may fail according to its predictive failure information. Without an apparatus and method for communicating predictive failure information between computer systems on a network and for dynamically rerouting a network request to avoid computer systems and network paths that may fail, the computer industry will continue to suffer from predictive failure information that is isolated within a system, with the result that failures that were predicted in individual computer systems may cause errors in inter-system communications over the network.

DISCLOSURE OF INVENTION

According to the preferred embodiments, an apparatus and method shares predictive failure information between computer system in a computer network. The shared predictive failure information allows dynamically rerouting a network request to avoid a computer system that may fail according to its predictive failure information. According to a first embodiment, if the requested resource on the network has predictive failure information that indicates the resource may soon fail, a message is returned to the requesting computer with information that includes possible alternative sites from; which the information may be obtained. If there is an alternative site, the requesting computer system may access the alternative site, thereby avoiding the computer system that may soon fail. If there is no alternative site, the requesting computer system may return an error message, or may simply access the original resource on the chance that is has not yet failed. According to a second embodiment, a router in the network may indicate one or more alternative paths to a resource if the predictive failure information for the router indicates it may soon fail. The requesting computer system may then access the requested resource via the alternative path. In this manner, predictive failure information can be used in rerouting network traffic between computer systems on a network to minimize the effect of a failing computer system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through sharing predictive failure information between systems that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

Another popular network protocol for perform administration tasks on a computer network is Simple Network Management Protocol (SNMP). Network protocols allow computers on a network to communicate together using predefined formats for messages that are passed back and forth on the network.

2. Detailed Description

According to preferred embodiments of the present invention, an apparatus and method communicate predictive failure information relating to one system on a network to another system on the network. By communicating predictive failure information between systems on a network, a system that requests a resource on another system can determine whether the resource will be available to fill the request. This information allows a requesting computer system to determine whether there exists an alternative resource or path to bypass the potential problem indicated by the predictive failure information.

Figure 1:
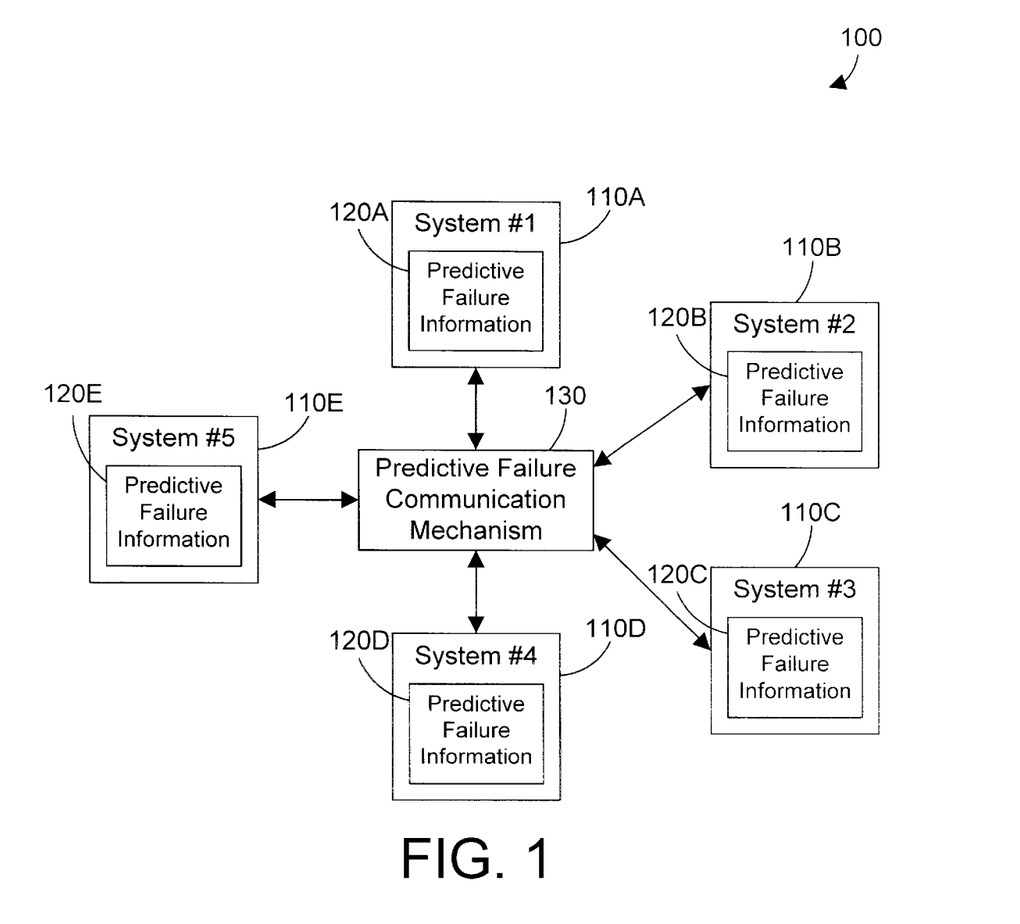
FIG. 1 is a logical block diagram of computer systems on a network that communicate their predictive failure information to other systems on the network.

Referring now to FIG. 1, a networked computer system 100 includes several different computer systems 110A–110E that each have corresponding predictive failure information 120A–120E. A predictive failure communication mechanism 130 is logically coupled to each computer system 110A–110E, and provides a way to share the predictive failure information 120A–120E on each system with other systems on the network. Note that FIG. 1 represents a logical connection between the predictive failure communication mechanism 130 and the computer systems 110A–110E on the network, and this logical connection could be achieved by virtually any physical computer network arrangement, whether now known or developed in the future.

Each system 10 in the preferred embodiments can be a full-blown computer system, such as an IBM personal computer (PC), or can be any other type of component or device that can communicate predictive failure information on a network. For example, some printers have network interfaces, and a printer would thus be one suitable type of "system" 110 referred to in FIG. 1. The preferred embodiments extend to any type of device that can communicate predictive failure information on a network, whether incorporated into a system or existing independent of other systems.

The predictive failure information 120 in FIG. 1 can take on a number of different forms. In one example, predictive failure information 120 comprises a list of performance parameters for a system 110 or for a component within a system 110. In this case, predictive failure communication mechanism 130 knows the acceptable ranges for the performance parameters, and determines when the performance parameters that comprise the predictive failure information 120 are within the acceptable ranges. In another example, predictive failure information 120 comprises a status message that indicates whether a predictive failure mechanism in the corresponding system has "tripped" or not. In this configuration, each system (or component) knows the acceptable ranges for performance parameters, and a predictive failure status that is "tripped" indicates that the performance parameters are outside of their acceptable ranges (meaning that a predictive failure may occur soon), while a status that is "not tripped" indicates that performance parameters for the system or component are within acceptable ranges (meaning that there is no indication of a predictive failure).

Predictive failure information 120 can also communicate predictive failure information at numerous different levels of granularity. For example, a single system may have ten different subsystems that each have corresponding predictive failure information. The predictive failure information 120 in this example could take on a number of different forms. For example, the predictive failure information relating to each subsystem could be written to a common file or data storage, which comprises the predictive failure information 120 for the system. In the alternative, the predictive failure information for all ten subsystems may be represented by a "tripped" or "not tripped" status, and the predictive failure information 120 for the system would thus show "tripped" if any of the predictive failure information for the ten subsystems indicate "tripped".In still another example, the predictive failure information 120 may simply indicate "not tripped" for the subsystems that are not tripped, but may include more detailed information for a subsystem if and when it trips.

This concept of granularity is important to understanding the various different modes of operation that are included within the scope of the preferred embodiments. For example, let's assume that the predictive failure information 120 for a selected system indicates "tripped" if any of its subsystems have tripped, and indicates "not tripped" if and only if all subsystems have not tripped. In this situation, if another computer system on the network requests a resource on this selected computer system (such as data), the predictive failure information 120 could simply indicate that the system is unavailable for the data transfer. In an alternative embodiment, predictive failure information 120,may indicate for how long the subsystem that "tripped" will be available, and if the subsystem will be available for a sufficient period of time to assure that the requested operation can be completed, the operation could then be allowed. In another alternative embodiment, the subsystem that "tripped" may not be the subsystem that is required to fill the resource request. For example, predictive failure information in a display subsystem may not affect the transfer of data, but is still present to indicate when the display system may need maintenance. In this example, the predictive failure information could indicate to the requesting system that the resource it needs is available even though another subsystem's predictive failure information has "tripped". We see from these examples presented above that there are numerous different options for communicating predictive failure information between systems on a network, and the preferred embodiments expressly extend to any and all options, whether now existing or developed in the future.

Figure 2:
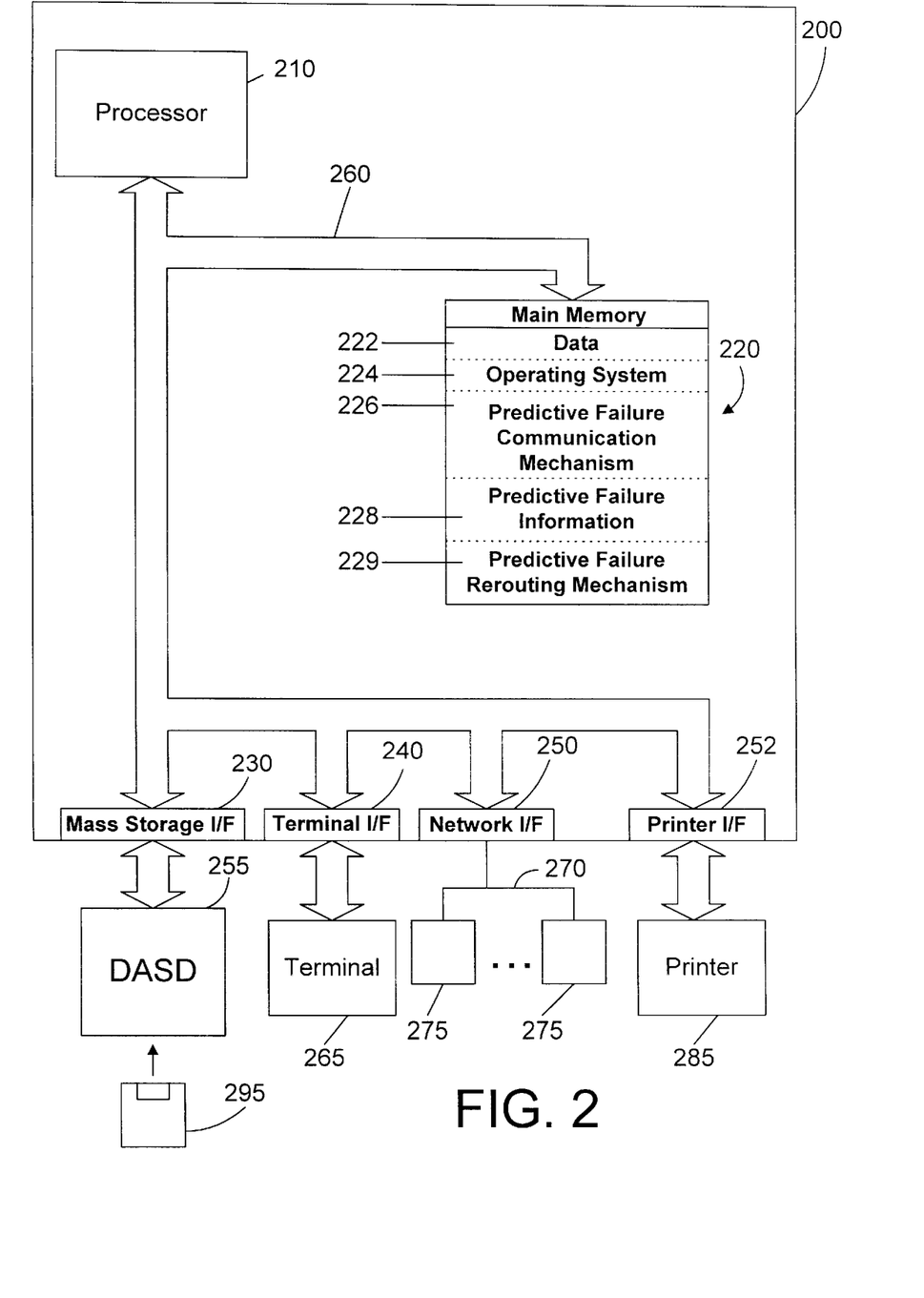
FIG. 2 is a block diagram of a particular computer system that may communicate its predictive failure information to other computer systems on a network.

Referring now to FIG. 2, a computer system 200 is an enhanced IBM AS/400 computer system, and represents one suitable type of system (e.g., 110A–110E of FIG. 1) that can be networked together in accordance with the preferred embodiments. As shown in FIG. 2, computer system 200 comprises a processor 210 connected to a main memory 220, a mass storage interface 230, a terminal interface 240,a network interface 250, and a printer interface 252. These system components are interconnected through the use of a system bus 260. Mass storage interface 230 is used to connect mass storage devices (such as a direct access storage device 255) to computer system 200. One specific type of direct access storage device 255 is a floppy disk drive, which may store data to and read data from a floppy diskette 295.

Main memory 220 contains data 222, an operating system 224, a predictive failure communication mechanism 226, predictive failure information 228, and a predictive failure rerouting mechanism 229. Data 222 represents any data that serves as input to or output from any program in computer system 200. Operating system 224 is a multitasking operating system known in the industry as OS/400; however, those skilled in the art will appreciate that the spirit and scope of the present invention is not limited to any one operating system. Predictive failure communication mechanism 226 provides a way to communicate predictive failure information 228 to other computer systems (e.g., 275) that are coupled via a network 270 to computer system 200. While a predictive failure communication mechanism 130 is shown in FIG. 1 to logically couple different computer systems on a network, one implementation of mechanism 130 in FIG. 1 has a local predictive failure communication mechanism 226 on one or more systems on the network, as shown in FIG. 2. The preferred embodiments expressly extend to any mechanism for sharing predictive failure information 228 between systems on a network.

Predictive failure information 228 comprises any form of information that may indicate, in whole or in part, whether a system or component may fail. In the preferred embodiment, predictive failure information 228 comprises a "tripped" or "not tripped" status that indicates whether or not a predictive failure warning has been generated. Note, however, that predictive failure information 228 may take on any other suitable form that is representative of data, status, or other information regarding the predictive failure of a component or system. Note that predictive failure information 228 may be representative of any component or combination of components in a system. Thus, predictive failure information 228 could contain predictive failure information relating to, for example, DASD 255, printer 285, processor 210, etc. In the preferred embodiments, predictive failure information 228 is written to main memory 220 by processor 210 via system bus 260, and could thus be derived in whole or in part from any device or interface coupled to system bus 260.

Predictive failure rerouting mechanism 229 performs rerouting of a resource request in accordance with the first embodiment if the predictive failure information corresponding to the resource indicates that the resource may soon fail. Such rerouting is possible if there is one or more alternative resources on the network that are equivalent to the requested resource. For example, if data is requested from a database, but the predictive failure information indicates that the hard disk drive upon which the database is stored may soon fail, the predictive failure rerouting mechanism 229 could direct the request to a mirrored hard disk drive that maintains all of the same data as the hard disk drive upon which the original database is stored. In another example, if the resource request is a request for a network printer, but the preferred printer is likely to fail due to predictive failure information (indicating, for example, that the toner is low), the request can be automatically routed to a different network printer instead.

In a second embodiment, if a network router or other computer system indicates that it may be unavailable due to predictive failure information, an alternative path may be selected to access the requested resource to bypass the affected network path. In both embodiments, predictive failure rerouting mechanism 229 preferably bypasses problems indicated by predictive failure information by rerouting the request, when possible.

Computer system 200 utilizes well known virtual addressing mechanisms that allow the programs of computer system 200 to behave as if they only have access to a large, single storage entity instead of access to multiple, smaller storage entities such as main memory 220 and DASD device 255. Therefore, while data 222, operating system 224, predictive failure communication mechanism 226, predictive failure information 228, and predictive failure rerouting mechanism 229 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, terminal interface 240, network interface 250, printer interface 252, and system bus 260.

Although computer system 200 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 210. However, those skilled in the art will appreciate that the present invention applies equally to computer systems that simply use I/O adapters to perform similar functions.

Terminal interface 240 is used to directly connect one or more terminals 265 to computer system 200. These terminals 265, which may be non-intelligent (i.e., dumb) terminals or fully programmable workstations, are used to allow system administrators and users to communicate with computer system 200. Note, however, that while terminal interface 240 is provided to support communication with one or more terminals 265, computer system 200 does not necessarily require a terminal 265, because all needed interaction with users and other processes may occur via network interface 250.

Network interface 250 is used to connect other computer systems and/or workstations (e.g., 275 in FIG. 2) to computer system 200 across a network 270. Network 270 represents the logical connections between computer system 200 and other computer systems on the network 270. The present invention applies equally no matter how computer system 200 may be connected to other systems, regardless of whether the network connection 270 is made using present-day analog and/or digital techniques or via some networking mechanism of the future. In addition, many different network protocols can be used to implement a network. As discussed in the Overview section, these protocols are specialized computer programs that allow computers to communicate across network 270. TCP/IP (Transmission Control Protocol/Internet Protocol) is an example of a suitable network protocol.

Printer interface 252 is used to send information to be printed to printer 285. As stated in the Background section, known mechanisms for generating predictive failure information been implemented for hard disk drives and for printers. Predictive failure information 228 may be indicative of any component within system 200 or coupled to system 200, including printer 285.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks (e.g., 295 of FIG. 2) and CD ROM, and transmission type media such as digital and analog communications links.

Figure 3:
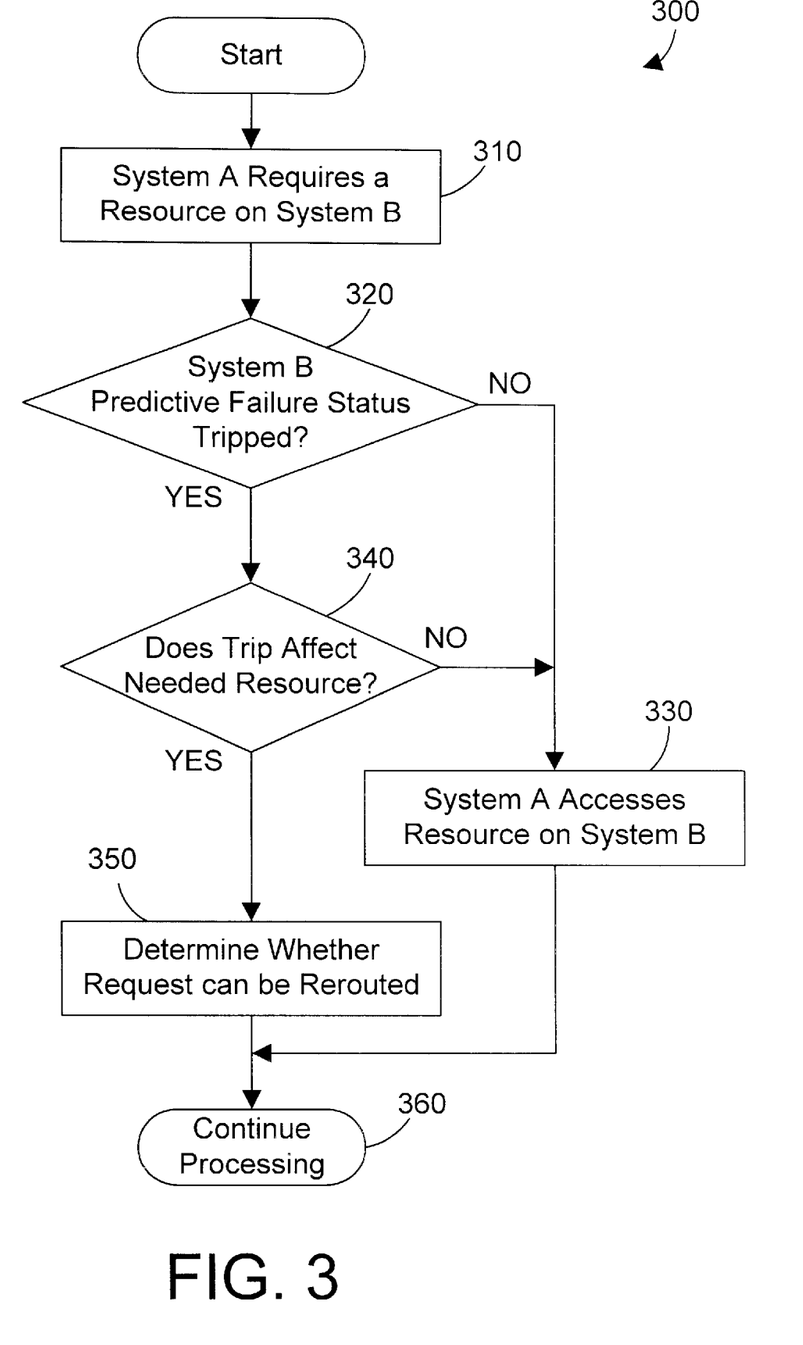
FIG. 3 is a flow diagram of a method for using predictive failure information when granting access to resources between computer systems on a computer network.

Referring to FIG. 3, a method 300 in accordance with the preferred embodiments of the present invention begins when one system, denoted System A, requires a resource on another system, denoted System B, on the network (step 310). For this example, we assume that predictive failure information includes a predictive failure status that is either "tripped" to indicate that the performance parameters for the resource or system lie outside their acceptable limits, or "not tripped" to indicate normal operation. If the predictive failure status on system B is not tripped (step 320=NO), system A may then access the resource on system B (step 330). If the predictive failure status on system B is tripped (step 320=YES), method 300 then determines whether the tripped predictive failure status affects the request for the resource on system B (step 340). In the example above, a tripped predictive failure status in a display subsystem probably would not affect the request for data on a hard disk drive in the same system, so the data request could be honored even though the predictive failure on the system has tripped. If the tripped predictive failure status does not affect the needed resource (step 340=NO), system A accesses the needed resource on system B (step 330). If the tripped predictive failure status does affect the needed resource (step 340=YES), then method 300 determines whether the request can be rerouted (step 350). Normal processing then continues (step 360). Note that step 340 is optional. If step 340 is omitted, when the predictive failure status of system B is tripped (step 320=YES), method 300 determines whether the request can be rerouted (step 350).

Figure 4:
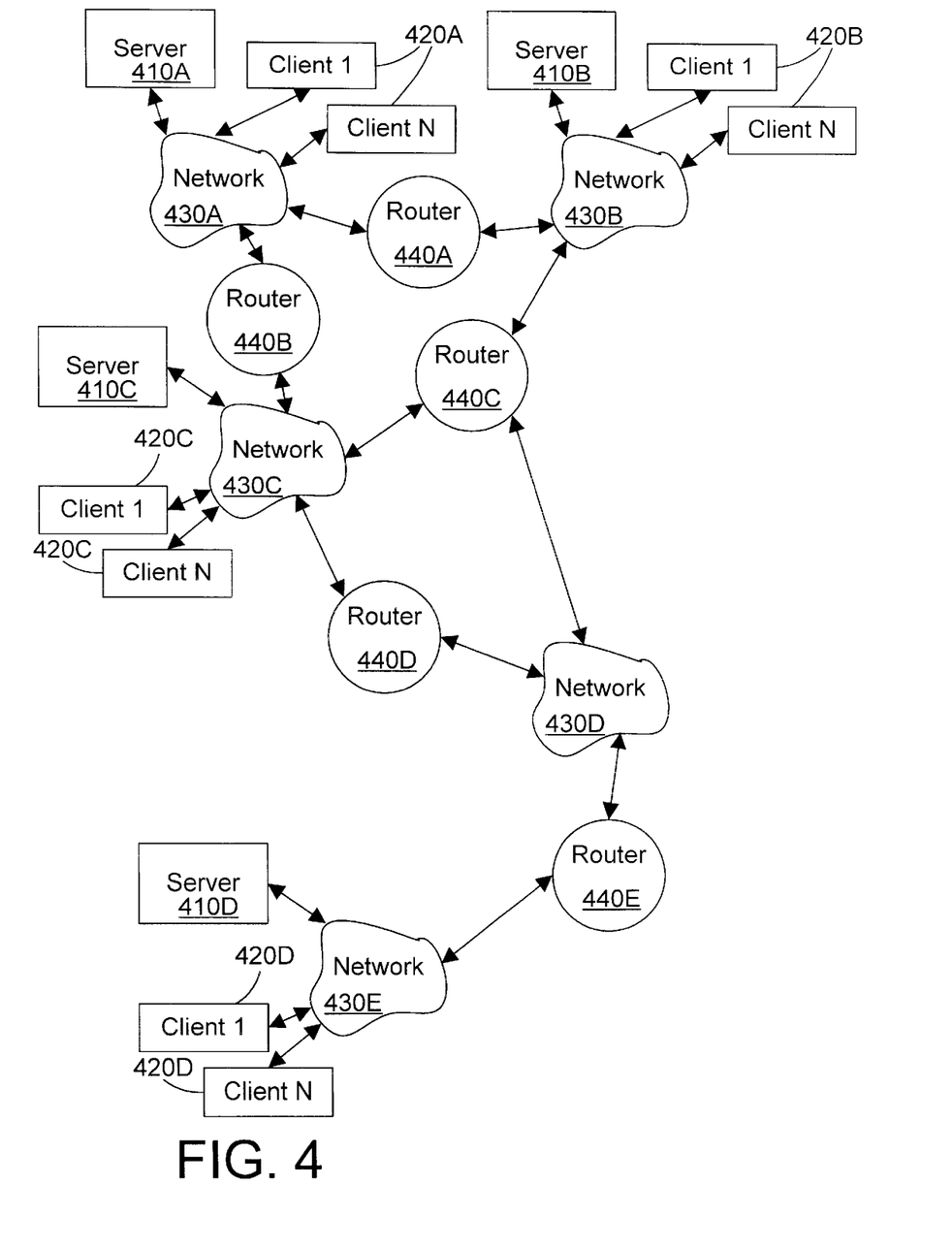
FIG. 4 is a block diagram of a sample network configuration for illustrating the concepts of the preferred embodiments.

A sample network configuration 400 is shown in FIG. 4 for the purpose of illustrating the concepts of the preferred embodiments. A first network 430A is shown that couples together a server 410A and multiple clients 420A to two routers 440A and 440B. In similar fashion, networks 430B, 430C, and 430E are each coupled to respective servers 410, clients 420, and routers 440 as shown. Another network 430D is shown without a server or clients. The sample network configuration of FIG. 4 is shown to illustrate that a variety of different network configurations can exist, all of which are within the scope of the preferred embodiments.

Figure 5:
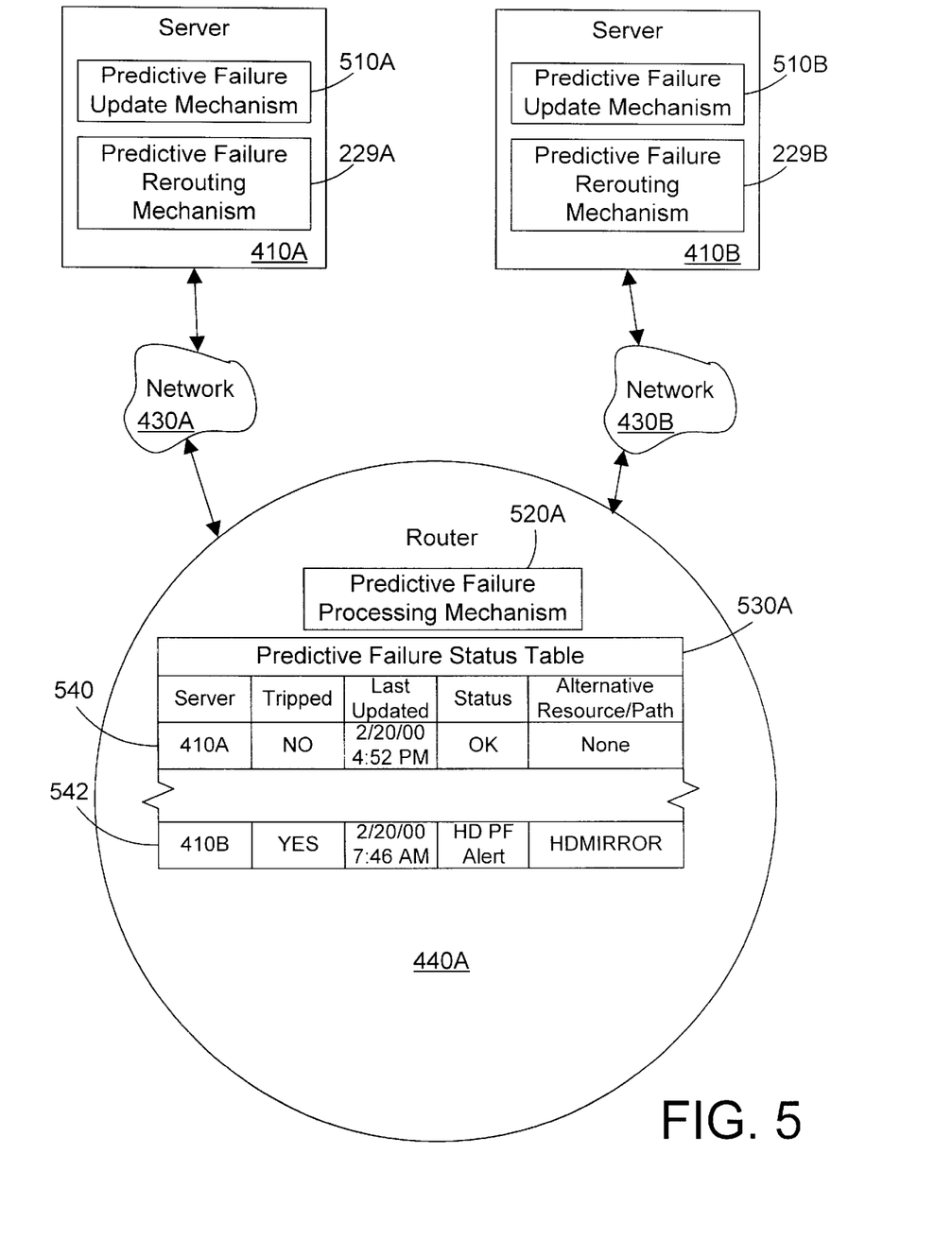
FIG. 5 is a block diagram of a portion of the sample network configuration in FIG. 4 showing predictive failure information that is stored in a common storage.

Referring now to FIG. 5, portions of the network diagram of FIG. 4 are shown in more detail to show one specific implementation for sharing predictive failure information among computer system on a network. For this implementation, we assume that a predictive failure status table 530A is defined within router 440A for each system coupled to it. In this particular example, server 410A and server 410B are both coupled to router 440A through their respective networks 430A and 430B. As a result, predictive failure status table 530A includes an entry 540 for server 410A and an entry 542 for server 410B. Note that the entries each specify whether the predictive failure status for the corresponding server is tripped or not, when the predictive failure status was last updated, any additional status information that may be needed, and whether there is an alternative resource or path. Thus, entry 540 indicates that the predictive failure status for server 410A is not tripped, that this status was last updated on Feb. 20, 2000 at 4:52 PM, that the status is OK (because the predictive failure status is not tripped), and that there is no alternative resource or path for server 410A. Entry 542 indicates that the predictive failure status for server 410B is tripped, that the predictive failure information was last updated on Feb. 20, 2000 at 7:46 AM, that the predictive failure status tripped due to a hard disk predictive failure alert, and that there is another computer system named HDMIRROR on the network that is an alternative resource for the hard disk drive in server 410B. Of course, the information contained within the predictive failure status table 530A can vary from that shown. Predictive failure status table 530A is one specific example, and the preferred embodiments expressly includes any common storage that can be accessed by two or more systems on the network for determining the predictive failure status of another system on the network.

The entries within predictive failure status table 530A are periodically updated by the predictive failure update mechanism 510A in each system writing its predictive failure status to the appropriate entry. A predictive failure processing mechanism 520A can then determine from the entries whether a request for a resource on server 410A or 410B can be honored based on the corresponding entries in the predictive failure status table. In the alternative, a system (such as server 410A) could include a predictive failure processing mechanism that reads the predictive failure status of another system from the common storage (e.g., the predictive failure status table 530A) before requesting a resource, to determine whether or not the resource can honor the request.

There are many suitable ways for a predictive failure update mechanism (such as 510A and 510B in FIG. 5) to update the common storage that contains its predictive failure status. For example, when the predictive failure information in the hard disk drive in system 410B trips, critical data on the hard disk drive can be copied to another resource (such as an alternative disk drive) either within system 410B or on any other system on the network. This copying of information preferably occurs before the entry 542 is updated to reflect that the predictive failure information for the hard disk drive tripped, and to provide the alternative resource HDMIRROR. In this manner the data is backed up before the predictive failure information is reflected in the common storage. Of course, many other methods exist for a system to update its predictive failure information, and the preferred embodiments expressly extends to any such method.

Figure 6:
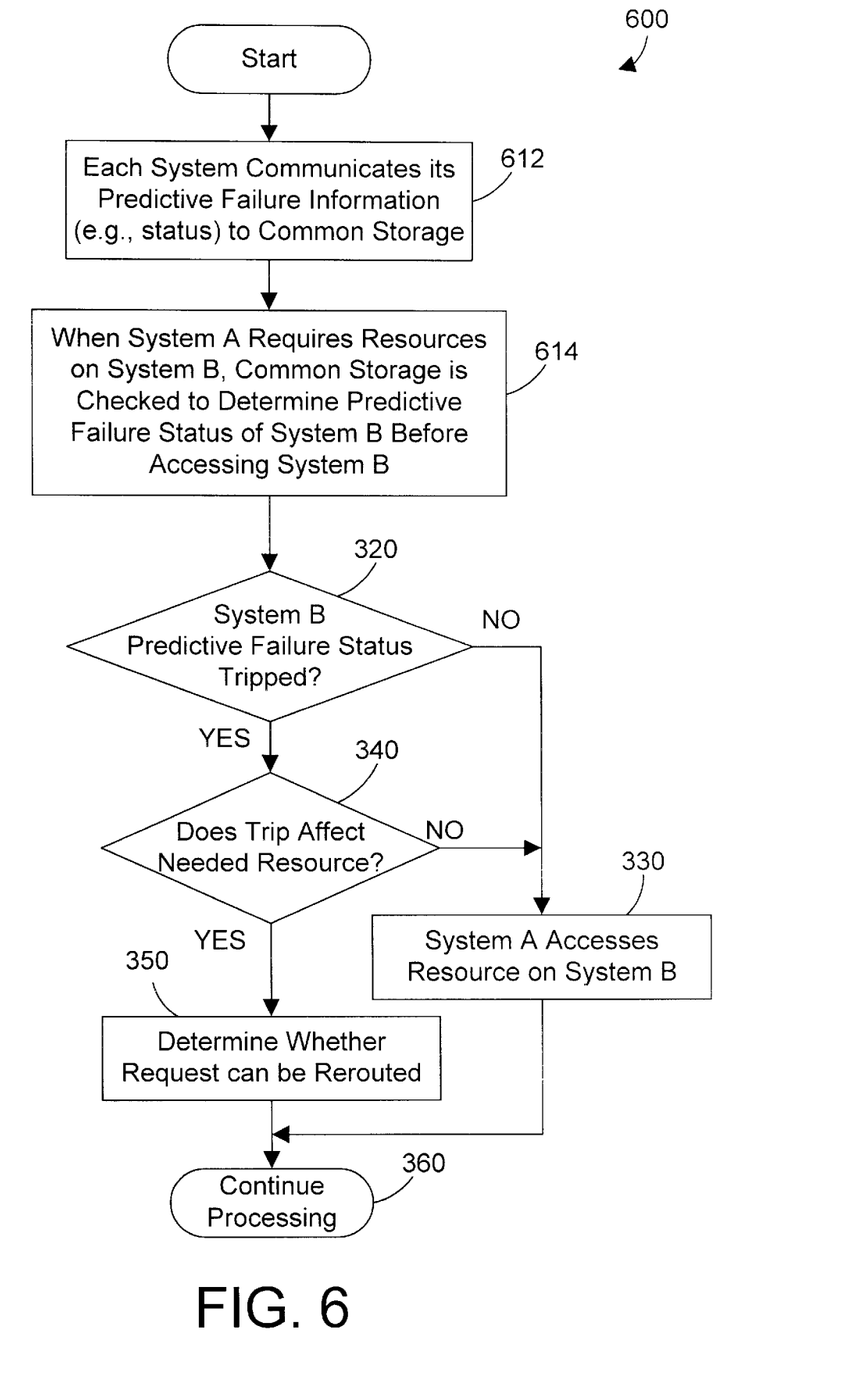
FIG. 6 is a flow diagram that shows the steps performed in a method that accesses predictive failure information in a common storage.

Referring to FIG. 6, a method 600 illustrates the steps in a method that accesses shared predictive failure information in a common storage, as illustrated by the example in FIG. 5. Note that method 600 is simply an implementation specific method for carrying out the more general steps of method 300 in FIG. 3. Each system communicates its predictive failure information or status to common storage (step 612). In FIG. 5, this step is carried out by the predictive failure update mechanisms 510A and 510B writing the predictive failure information and/or status for their respective systems 410A and 410B to the appropriate entries in predictive failure status table 530A. Next, when a system, denoted System A, requires resources from another system, denoted System B, the common storage is checked to determine the predictive failure status of system B before accessing the requested resource in system B (step 614). This checking in step 614 can be performed by the requesting system (system A), or can be performed by a mechanism external to system A (such as predictive failure processing mechanism 520A in FIG. 5). At this point the predictive failure status of system B is known, and the flow in steps 320, 330, 340, 350 and 360 are as described above with reference to FIG. 3.

Figure 7:
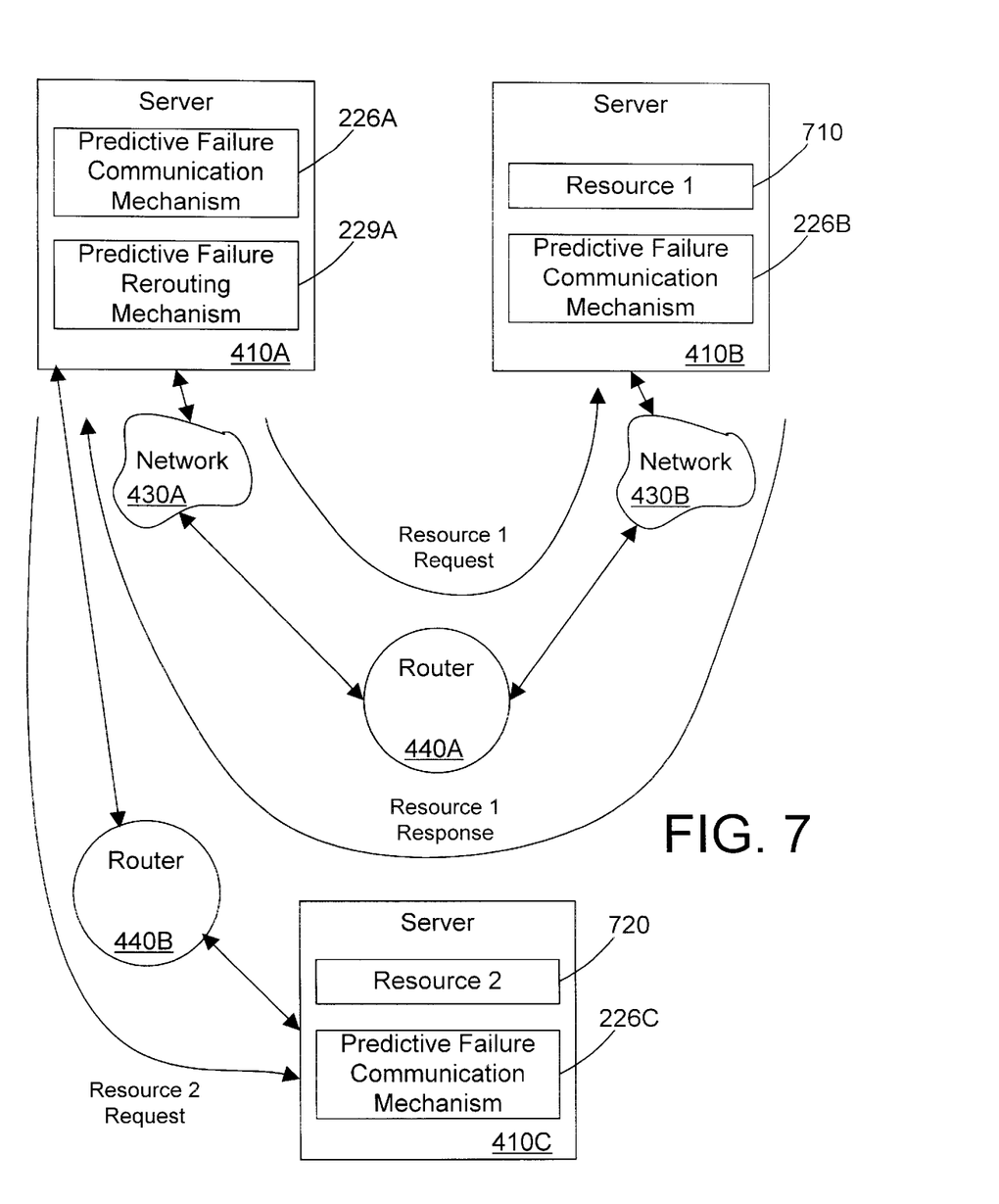
FIG. 7 is a block diagram of a portion of the sample network configuration in FIG. 4 showing an implementation that returns predictive failure information and possible alternative resources or paths in response to a request for a resource.

A second implementation uses network messages to communicate predictive failure information between systems. One specific implementation of such a system is shown in FIG. 7. Systems 410A, 410B, and 410C each include respective predictive failure communication mechanisms 226A, 226B, and 226C. When a resource is requested via a network message, the response to the request preferably includes information regarding the predictive failure information or status for the system or resource being requested, along with any information that will help in rerouting the request, if possible. For example, when server 410A performs a request for resource 710 on server 410B, the message goes through network 430A and router 440A to network 430B to server 410B. The predictive failure communication mechanism 226B in server 410B responds to the request with a message that includes information relating to the predictive failure information or status of server 410B, and with information regarding an alternative resource, which we assume corresponds to server 410C. In this manner server 410A can determine whether a resource on server 410B is available without performing any dedicated requests on the network relating to predictive failure information. If the requested resource on server 410B is not available, server 410A reads the data returned in the response from server 410B to determine whether an alternative resource or path is available. In this example, we assume that server 410C includes an alternative resource 720 that is equivalent to the requested resource 710. When server 410A determines from the predictive failure information or status passed from server 410B that the requested resource is not available, server 410 reroutes the request to the equivalent resource 720, in this case through router 440B to server 410C. This allows a server to automatically detect when predictive failure information indicates a resource may soon fail, and to automatically request an equivalent resource if such a resource is available.

Figure 8:
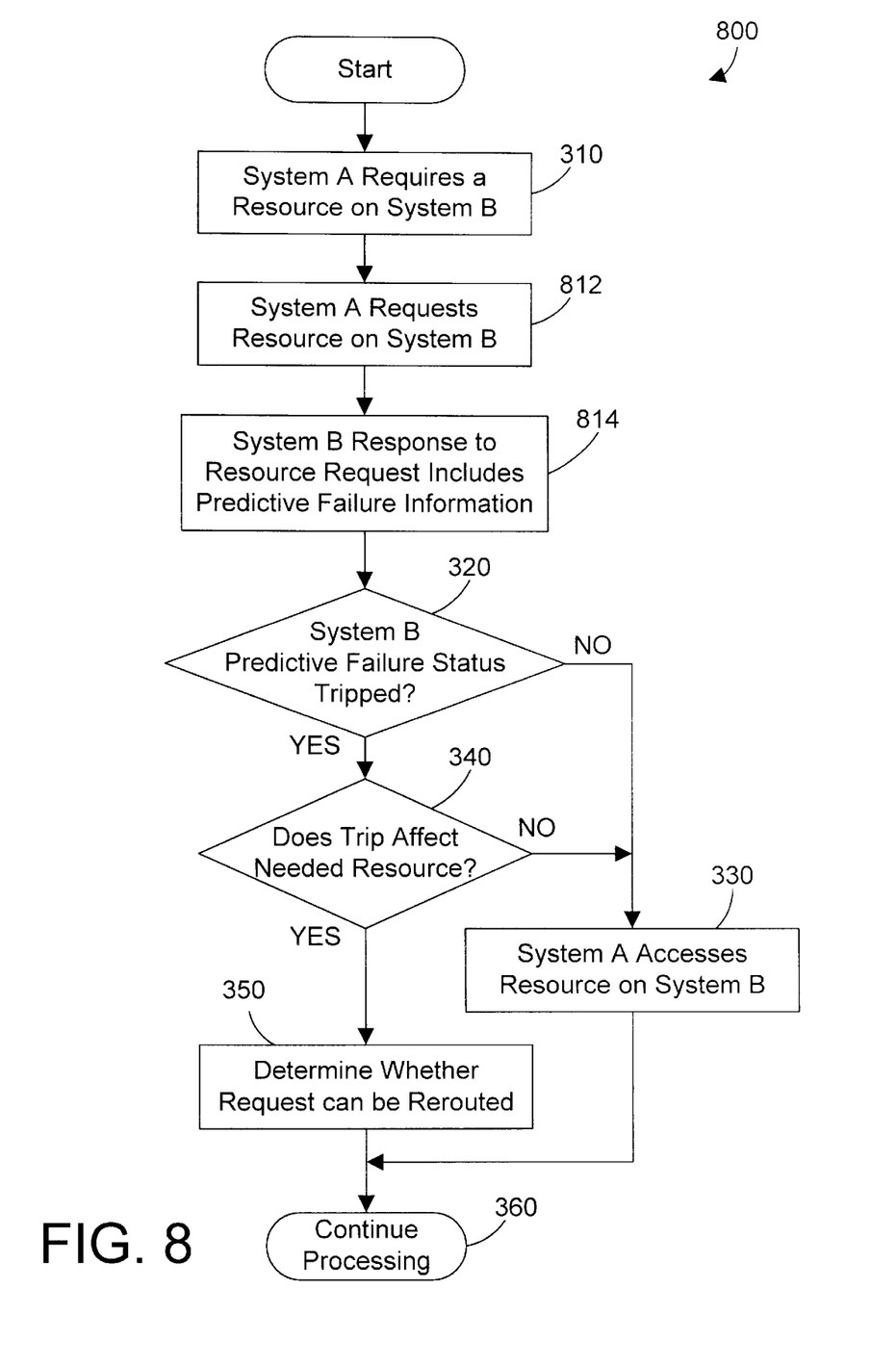
FIG. 8 is a flow diagram that shows the steps performed in a method that returns predictive failure information as part of a response to a request for a resource.

FIG. 8 illustrates a method 800 for returning predictive failure information, as part of a network message as illustrated by the example in FIG. 7. As was the case for method 600, method 800 is also a more detailed implementation of the more general method 300 in FIG. 3. Method 800 begins when one system (system A) requires a resource on another system (system B) (step 310). System A then requests the resource on system B (step 812). In response, system B responds to the request with a message that includes predictive failure information or status (step 814). At this point steps 320, 330, 340, 350 and 360 are the same as shown and discussed with reference to method 300 in FIG. 3.

Figure 9:
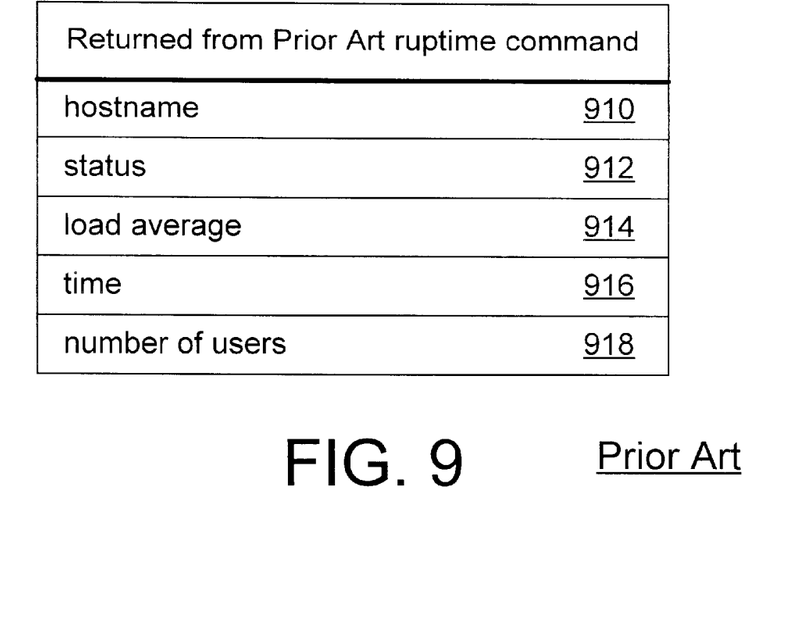
FIG. 9 is a block diagram showing the information returned when a prior art ruptime command is issued.
Figure 10:
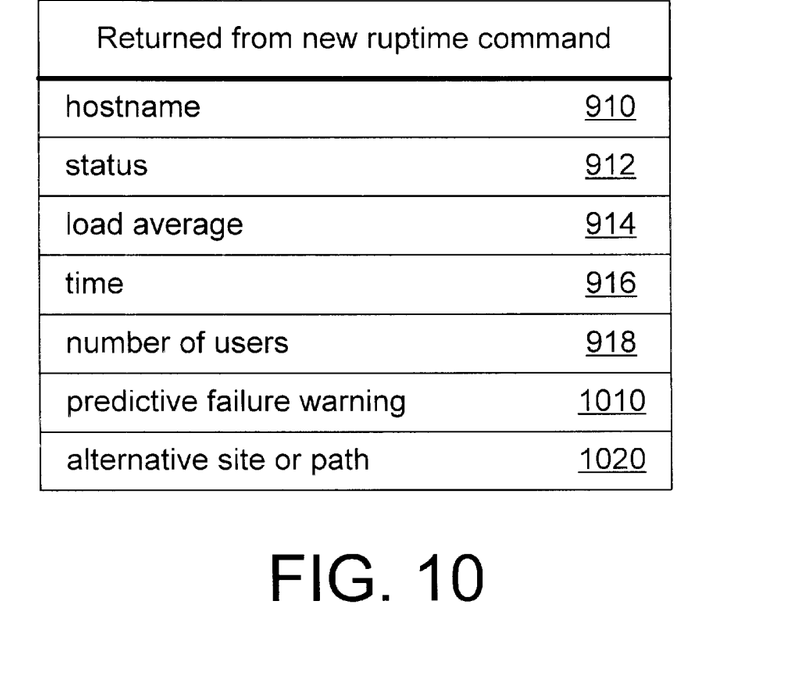
FIG. 10 is a block diagram showing the information returned (including predictive failure information and an alternative site or path, if any) when a new ruptime command in accordance with the preferred embodiments is issued.

A specific example of how a network message can be modified to include predictive failure information is now presented. Let's assume that two different servers that are coupled together on a network need to communicate with each other. We assume that these servers communicate via TCP/IP, which means that each server has its own unique TCP/IP address. We assume that both servers are running a special program called rwhod daemon, which is a computer program that responds to two specific TCP/IP commands, namely rwho and ruptime. The prior art format for a response to the ruptime command is shown in FIG. 9, and includes a specification of host name 910, status 912, load average 914, time 916, and number of users 918. Those familiar with networking and with TCP/IP will be familiar with the rwhod daemon and the ruptime command. Referring now to FIG. 10, the rwhod daemon in accordance with the preferred embodiments is modified to provide a predictive failure warning 1010 and an alternative site or path 1020 in addition to the prior art portions shown in FIG. 9. In this way, the status of a system is augmented to include predictive failure information and a specification of equivalent resources or alternative paths. Note that this implementation provides an advantage over the previous implementation in FIGS. 5 and 6 because this implementation piggybacks onto an existing message, which means that no special commands are needed to share predictive failure information and to indicate possible alternative resources or paths. As a result, network traffic is not significantly increased by changing an existing network command to include predictive failure information and alternative resources or paths.

Use of the ruptime command is generally suitable only for local machines on a network. In order to cross between different networks via routers, the simple network management protocol (SNMP) is better suited. SNMP is the standard TCP/IP network management protocol. SNMP operates via simple "get" and "put" commands that access data on routers. SNMP permits obtaining the status and control of routers. The information that must be maintained by routers and which can or cannot be altered is defined in a standard known as the Management Information Base (MIB). There are several MIB categories that could be relevant for predictive failure information. These include individual network interfaces, Internet control message protocol, or transmission control protocol. In one embodiment of the invention using SNMP, another category is added to the MIB called "Internet predictive failure protocol". One advantage of the MIB is that it is separate from the network management protocol so that different networks running their own SNMP that includes predictive failure information can interoperate with other networks running SNMP.

Figure 11:
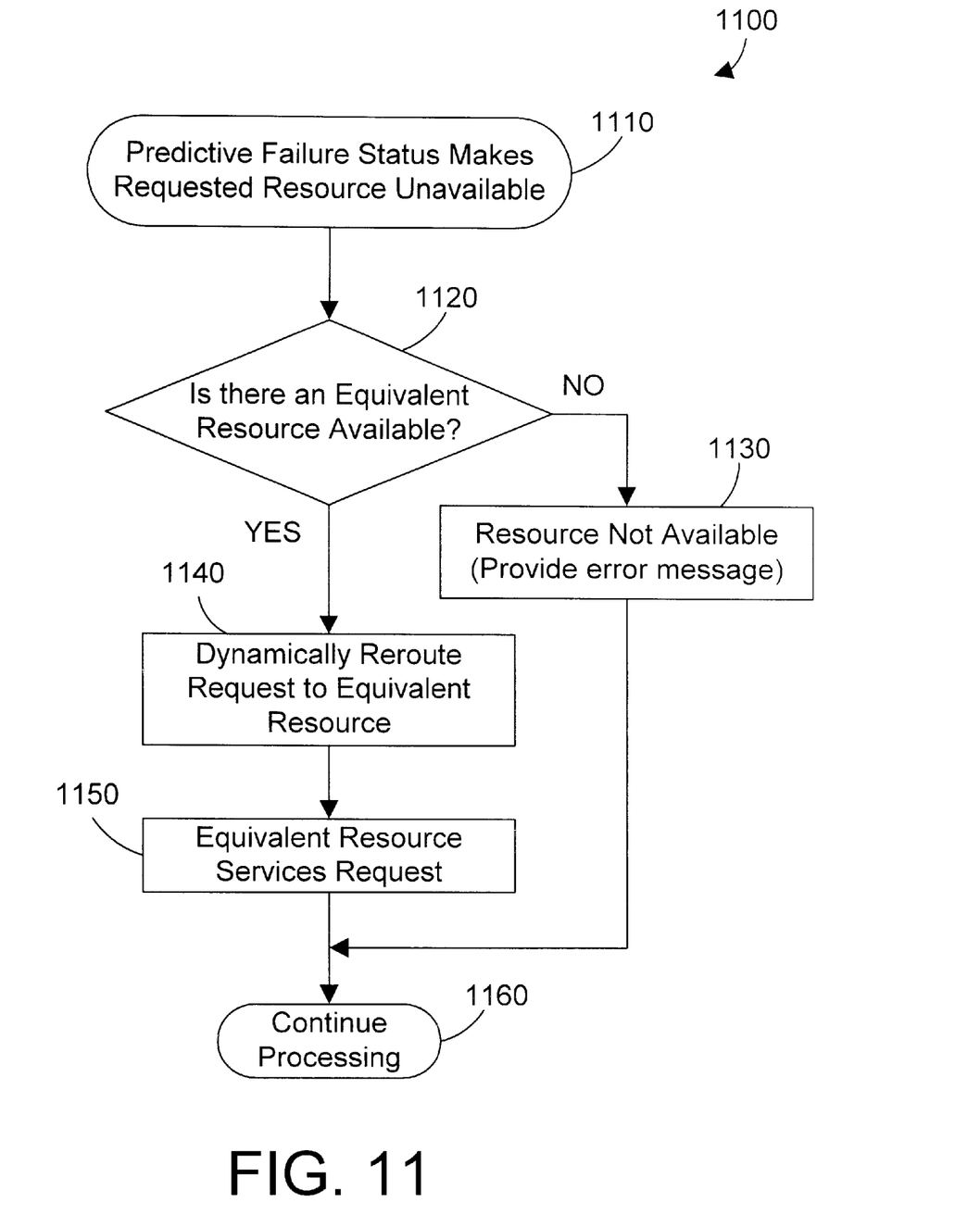
FIG. 11 is a flow diagram that shows the steps in rerouting a request for a network resource to an equivalent different network resource in accordance with the first embodiment.

FIG. 11 illustrates steps performed in a method 1100 in accordance with a first embodiment of the invention that allows a requesting resource to request an equivalent resource, if such a resource exists. Note that method 1100 corresponds to step 350 in FIGS. 3, 6 and 8. If the requested resource is unavailable, as indicated by the predictive failure information (step 1110), status information relating to the availability of an equivalent resource is read to determine whether there is an equivalent resource available (step 1120). For example, step 1120 could read the Alternative Request/Path portion of the predictive failure information for a particular server or resource, as shown in FIG. 5. In the alternative, step 1120 could read the alternative site or path 1020 returned from the ruptime command, as shown in FIG. 10. Of course, other implementations within the scope of the preferred embodiments could also communicate whether or not there is an alternative site or path. If there is no alternative resource available (step 1120=NO), the resource is unavailable (step 1130), which typically results in providing an error message to the requesting computer system. Of course, in the alternative, the requesting computer system may access the requested resource anyway, recognizing that an error may occur of the resource fails before the transaction with the resource is complete. If there is an equivalent resource (step 1120=YES), the resource request is dynamically rerouted to the equivalent resource (step 1140), and the equivalent resource then services the request (step 1150). At this point, normal processing continues (step 1160).

Figure 12:
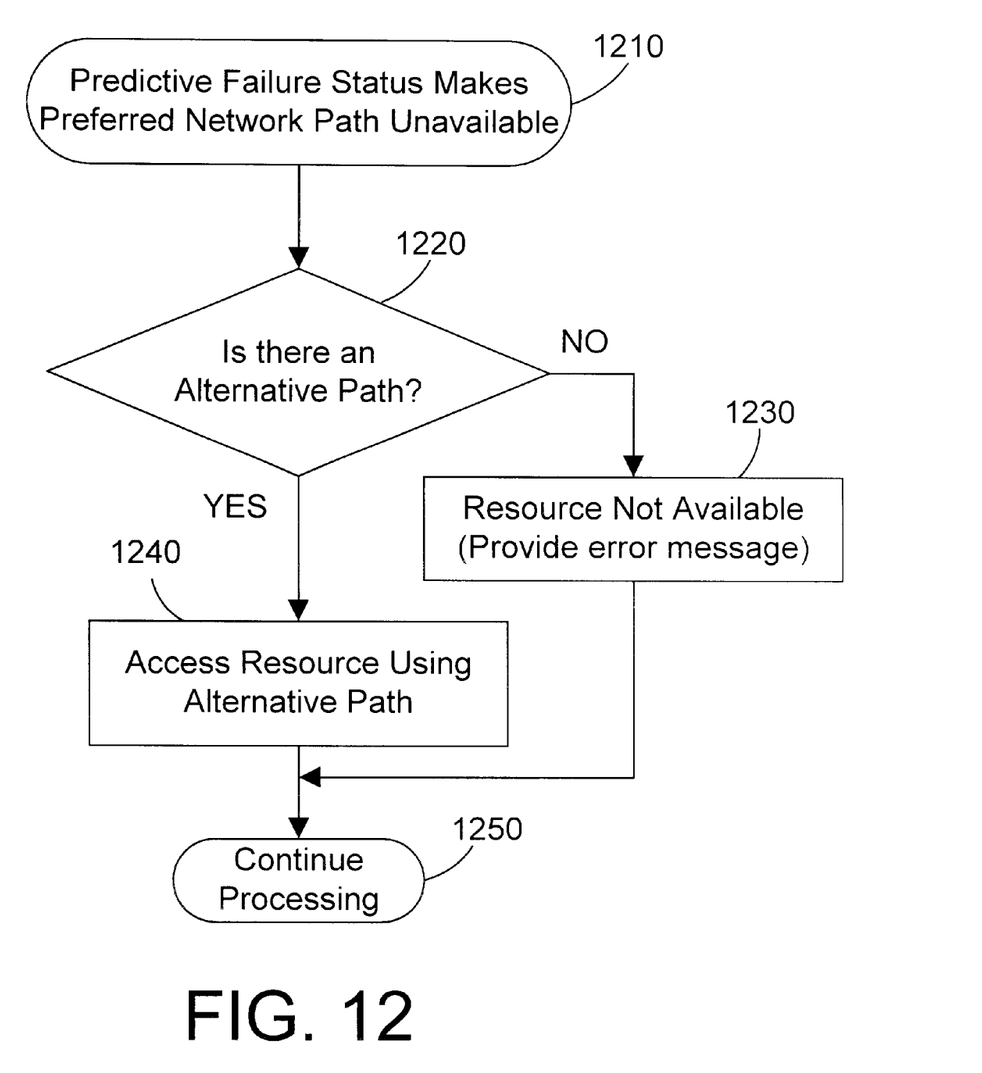
FIG. 12 is a flow diagram that shows the steps in a method in accordance with the second embodiment that reroutes a request for a resource around a router that has predictive failure information that indicates that a failure may soon occur in the router.

Referring now to FIG. 12, a method 1200 in accordance with the second embodiment is used to determine whether an alternative path to the resource exists if a resource in the preferred path becomes unavailable due to predictive failure information (step 1210). If there is no alternative path to access the same resource (step 1220=NO), the resource is not available (step 1230), which can result in an error message being sent to the requesting computer system, or which can result in the requesting computer system attempting to access the resource notwithstanding the predictive failure information. If there is an alternative path to access the requested resource (step 1220=YES),the requested resource is accessed using the alternative path (step 1240). At this point, normal processing continues (step 1250).

The difference between the first and second embodiments disclosed herein is the difference between accessing a different, equivalent resource and accessing the same resource via a different network path. The first embodiment determines whether there are any equivalent resources for the requested resource if the requested resource is unavailable. The second embodiment determines whether there are any other network paths that allow the requesting computer system to access the requested resource. Thus, the first embodiment deals with equivalent resources, while the second embodiment deals with equivalent paths for accessing the original resource.

A simple example is now presented that illustrates the usefulness of sharing predictive failure information on a network. Referring to FIG. 2, we assume that predictive failure information is generated for printer 285, and stored in main memory as predictive failure information 228. Predictive failure communication mechanism 226 can then make this information regarding the printer available to other systems (e.g., 275) on the network. By sharing predictive failure information regarding the printer, a different system can determine whether the printer might fail before completing a particular print job. Let's assume for the sake of example that the predictive failure information includes information regarding the number of pages the printer can print based on the amount of remaining paper and toner. If we assume that a different system wants to print to printer 285, it can first determine from the predictive failure information 228 whether or not the printer can handle the particular print job without running out of paper or toner. If the predictive failure information for the printer indicates that the print job is larger than the expected number of pages that can be successfully printed, the print job could then be routed to a different printer on the network. This example locates an equivalent resource, as described above with respect to the first embodiment.

The present invention as described with reference to the preferred embodiments herein provides significant improvements over the prior art. Predictive failure information is no longer constrained to the box level, but can now be shared with other systems on the network. By sharing predictive failure information on a network, a more robust networked computer system results because failures or data losses that might occur due to predicted failures can be avoided by first checking the predictive failure information or status of a system before using a resource on that system. In addition, should predictive failure information indicate that a failure may soon occur, the preferred embodiments herein allow accessing an equivalent resource, or accessing the original resource via an alternative path.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, instead of storing predictive failure information in a common storage, or communicating predictive failure information as part of a particular network command, predictive failure information could also be conveyed in the data itself. In other words, the network; protocol could reserve certain bytes in each data message that specify predictive failure information, along with the location of an alternative resource or path. This implementation would allow routers to monitor data to dynamically detect when predictive failure information requires rerouting to a different resource or a different path. This an other variations are expressly within the scope of the preferred embodiments.

I claim:

1. An apparatus comprising:
    a plurality of computer systems coupled together via a network, wherein a first of the plurality of computer systems includes corresponding predictive failure information that indicates whether at least one component on the first computer system will likely fail within a specified time,
    a predictive failure communication mechanism coupled to the network that communicates the predictive failure information to at least one other computer system on the network, wherein the predictive failure communication mechanism comprises a message in a network protocol for communication between computer systems on the network, wherein the message includes predictive failure information when a second computer system requests a resource on the first computer system: and
    a predictive failure rerouting mechanism coupled to the network that reroutes a request for a resource on the first computer system according to the predictive failure information for the first computer system.

2. The apparatus of claim 1 wherein the predictive failure information includes performance information for at least one component on the first computer system.

3. The apparatus of claim 1 wherein the predictive failure information indicates whether a resource on the first computer system is capable of fulfilling a request from another computer system on the network.

4. The apparatus of claim 1 wherein the predictive failure communication mechanism accesses the predictive failure information in a common storage to determine whether the first computer system is able to service the request for a resource.

5. The apparatus of claim 1 wherein the message specifies an alternative site for accessing an equivalent resource on a different computer system on the network.

6. The apparatus of claim 1 wherein the predictive failure rerouting mechanism determines an alternative site for accessing an equivalent resource on a different computer system on the network, and submits a request for the equivalent resource to the different computer system.

7. The apparatus of claim 1 wherein the predictive failure rerouting mechanism determines an alternative path for accessing the requested resource, and submits a request for the resource via the alternative path.

8. A networked computer system comprising:
    a plurality of computer systems that each includes corresponding predictive failure information that indicates when at least one component in the corresponding computer system will likely fail within a specified time;
    a predictive failure communication mechanism communicating with the plurality of computer systems and communicating the predictive failure information of a selected computer system to at least one other computer system on the network wherein the predictive failure communication mechanism comprises a message in a network protocol for communication between computer systems on the network, wherein the message includes predictive failure information when a second computer system requests a resource on the first computer system and
    a predictive failure rerouting mechanism coupled to the network that reroutes a request for a resource on a first computer system according to predictive failure information for the first computer system.

9. The networked computer system of claim 8 wherein the predictive failure information indicates whether at least one component on the first computer system will likely fail within a specified time.

10. The networked computer system of claim 8 wherein the predictive failure information includes performance information for at least one component on the first computer system.

11. The networked computer system of claim 8 wherein the predictive failure information indicates whether a resource on the first computer system is capable of fulfilling a request from another computer system on the network.

12. The networked computer system of claim 8 wherein the predictive failure communication mechanism accesses the predictive failure information in a common storage to determine whether the first computer system is able to service a request for a resource on that computer system.

13. The networked computer system of claim 8 wherein the message specifies an alternative site for accessing an equivalent resource on a different computer system on the network.

14. The networked computer system of claim 8 wherein the predictive failure rerouting mechanism determines an alternative site for accessing an equivalent resource on a different computer system on the network, and submits a request for the equivalent resource to the different computer system.

15. The networked computer system of claim 8 wherein the predictive failure rerouting mechanism determines an alternative path for accessing the requested resource, and submits a request for the resource via the alternative path.

16. A computer-implemented method for rerouting a network request to a first computer system coupled to a network to a second computer system coupled to the network, the method comprising the steps of:
    determining predictive failure information for at least one component on the first computer system;
    communicating the predictive failure information to at least one other computer system on the network:
    rerouting a request for a resource on the first computer system to the second computer system if the predictive failure information for the first computer system indicates that the requested resource may fail within a specified time, and if the second computer system includes a resource that is equivalent to the requested resource; and
    the first computer system sending a message that includes predictive failure information to a computer system on the network that requested the resource on the first computer system.

17. The method of claim 16 wherein the predictive failure information includes performance information for at least one component on the first computer system.

18. The method of claim 16 wherein the predictive failure information indicates whether a resource on the first computer system is capable of fulfilling a request from another computer system on the network.

19. The method of claim 16 further comprising the step of accessing the predictive failure information in a common storage to determine whether a resource on the first computer system is able to service a request from another computer system on the network.

20. A computer-implemented method for rerouting a network request to a first computer system coupled to a network to a second computer system coupled to the network, the method comprising the steps of:

determining predictive failure information for at least one resource on the first computer system;

a third computer system on the network requesting a resource on the first computer system;

the first computer system communicating the predictive failure information for the requested resource to the third computer system;

if the predictive failure information indicates that the requested resource may not be available to fill the request, performing the step of:

rerouting the request for the resource on the first computer system to the second computer system if the second computer system includes a resource that is equivalent to the requested resource.

21. The method of claim 20 further comprising the step of communicating at least one alternative site to the third computer system with the predictive failure information for the first computer system, the at least one alternative site including a resource that is equivalent to the requested resource.

22. The method of claim 20 further comprising the steps of:

determining an alternative path for accessing the requested resource; and     submitting a request for the resource via the alternative path.

23. A program product comprising:

(A) a predictive failure communication mechanism that communicates predictive failure information for a first computer system to at least one other computer system on a computer network that is coupled to the first and to the at least one other computer system, wherein the predictive failure communication mechanism comprises a message in a network protocol for communication between computer systems on the network, wherein the message includes predictive failure information when a second computer system requests a resource on the first computer system, the predictive failure information indicating whether at least one component on the first computer system will likely fail within a specified time;

(B) a predictive failure rerouting mechanism that reroutes a request for a resource on a first computer system according to predictive failure information for the first computer system, and (C) computer readable signal bearing media bearing the predictive failure communication mechanism and the predictive failure rerouting mechanism.

24. The program product of claim 23 wherein the signal bearing media comprises recordable media.

25. The program product of claim 23 wherein the signal bearing media comprises transmission media.

26. The program product of claim 23 wherein the predictive failure information includes performance information for at least one component on the first computer system.

27. The program product of claim 23 wherein the predictive failure information indicates whether a resource on the first computer system is capable of fulfilling a request from another computer system on the network.

28. The program product of claim 23 wherein the predictive failure communication mechanism accesses the predictive failure information in a common storage to determine whether the first computer system is able to service the request for a resource.

29. The program product of claim 23 wherein the message specifies an alternative site for accessing an equivalent resource on a different computer system on the network.

30. The program product of claim 23 wherein the predictive failure rerouting mechanism determines an alternative site for accessing an equivalent resource on a different computer system on the network, and submits a request for the equivalent resource to the different computer system.

31. The program product of claim 23 wherein the predictive failure rerouting mechanism determines an alternative path for accessing the requested resource, and submits a request for the resource via the alternative path.

\* \* \* \* \*